United States Patent Office 2,856,062
Patented Oct. 14, 1958

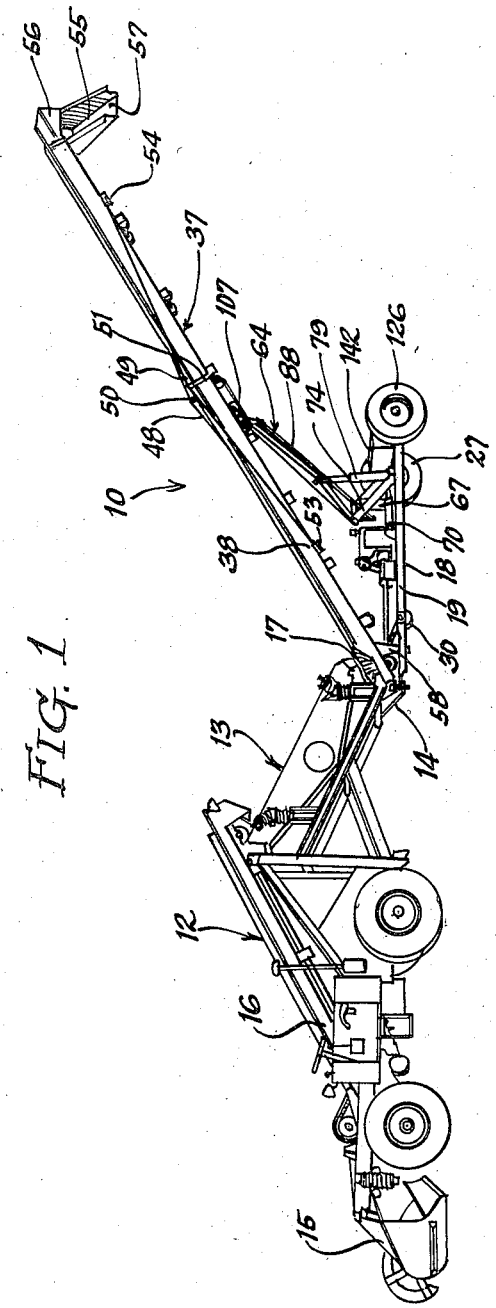

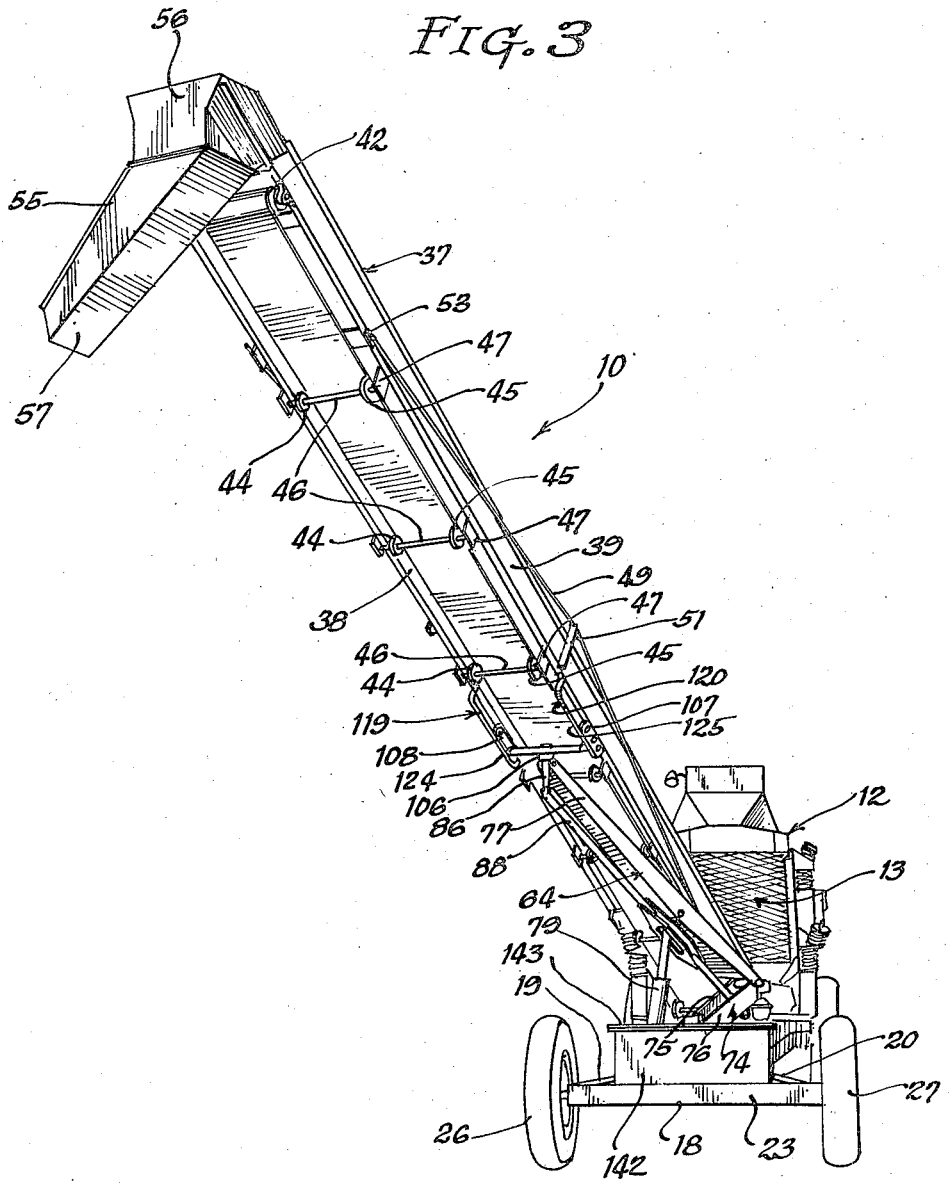

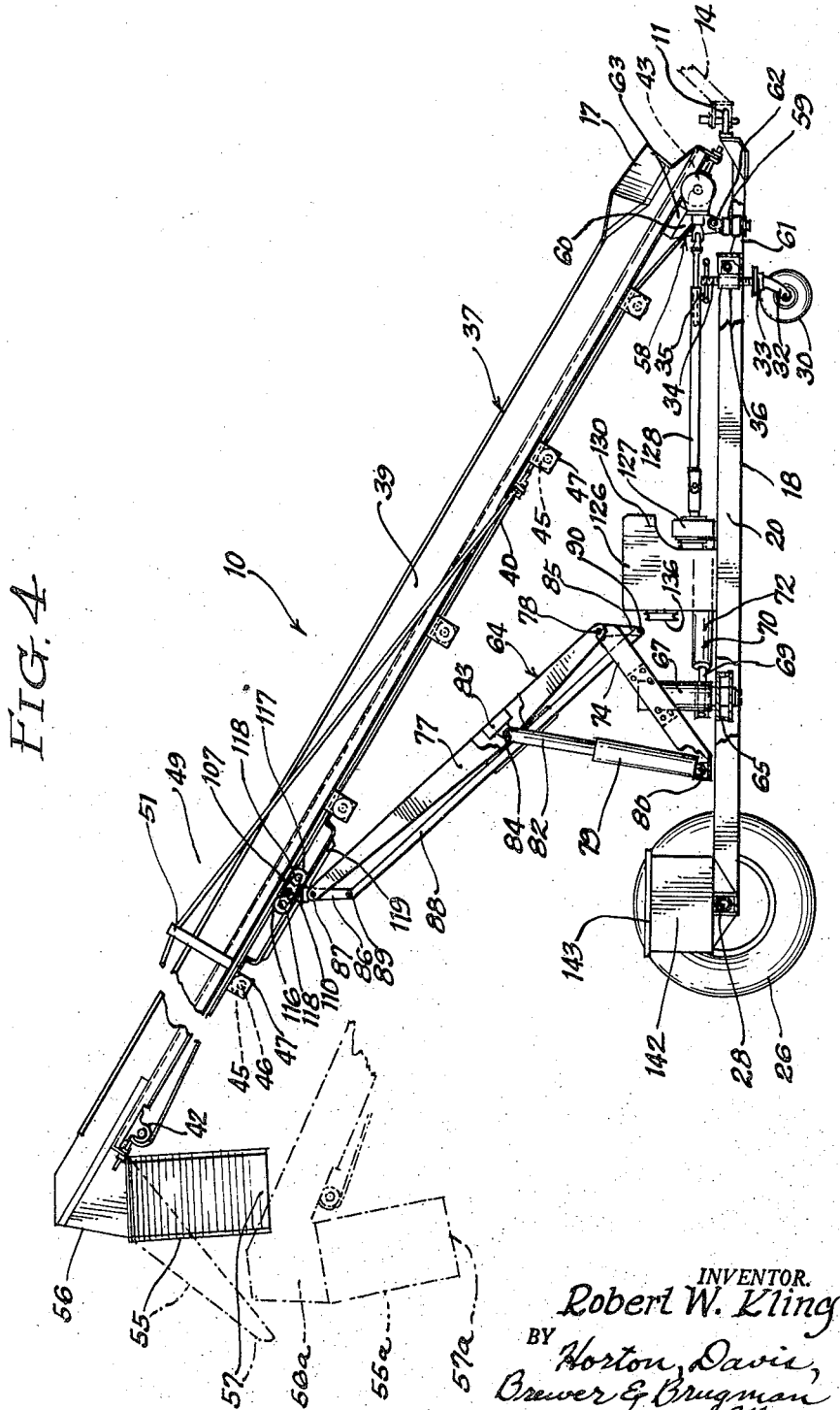

2,856,062

CONVEYOR

Robert W. Kling, Wilmette, Ill., assignor to Athey Products Corporation, Chicago, Ill., a corporation of Illinois Application August 7, 1956, Serial No. 602,560

14 Claims. (Cl. 198—119)

This invention relates to conveyors, and more particularly to a conveyor which may be made in portable form, if desired, for use with motivated loaders and the like, and which embodies structure for effecting both lateral and vertical adjustments of the discharge end thereof.

One of the objects of my invention is to provide a portable conveyor adapted to use with a motivated material pick-up and loading machine, and which conveyor is suited to the reclaiming and loading of ballast along railway tracks.

As another object, my invention comprehends the provision of a conveyor mounted relative to a support in a manner such that the discharge end thereof can be raised or lowered and swung laterally without materially changing the position of the end at which material is fed to the conveyor.

My invention further has within its purview the provision of conveyor carried on a supporting structure and embodying mechanism for effecting vertical and lateral swinging movements of the conveyor relative to the support while maintaining relative stability of the conveyor and supporting structure.

It is a further object of this invention to provide a portable conveyor adapted to be towed behind a motivated loading machine and to receive material from the loading machine, and which conveyor has thereon a prime mover for driving the conveyor and for furnishing power for varying the position of the conveyor relative to its supporting structure.

This invention also comprehends the provision of an elevating and swivel mechanism adapted to use as an adjustable support for an elevating conveyor.

These and other objects of this invention will become apparent from the following detailed description when taken together with the accompanying drawings in which:

Fig. 1 is a side elevational view of a conveyor embodying a preferred form of my invention and illustrates that conveyor in association with a loading and sifting machine of a type adapted to use in the collection and screening of the ballast; the conveyor being shown in an elevated position;

Fig. 2 is similar to Fig. 1, except that the loading and sifting machine is illustrated in dot and dash lines and the conveyor is shown in a lowered position, such as might be used during movement of the conveyor from one position of use to another;

Fig. 3 is a perspective view taken from the rear of a conveyor of the type illustrated in Figs. 1 and 2 and includes the loading and sifting machines shown in Figs. 1 and 2;

Fig. 4 is a side elevational view, drawn to a larger scale than Figs. 1 and 2, and illustrates the conveyor structure without the inclusion of the loading and sifting machine, and also includes an indication in dot and dash lines of a lowered position of the conveyor;

Figure 5:
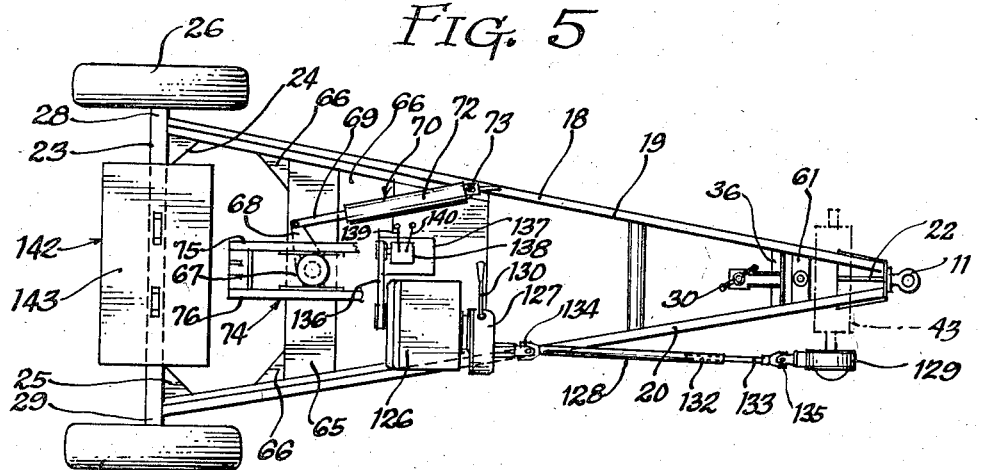
Figure 6:
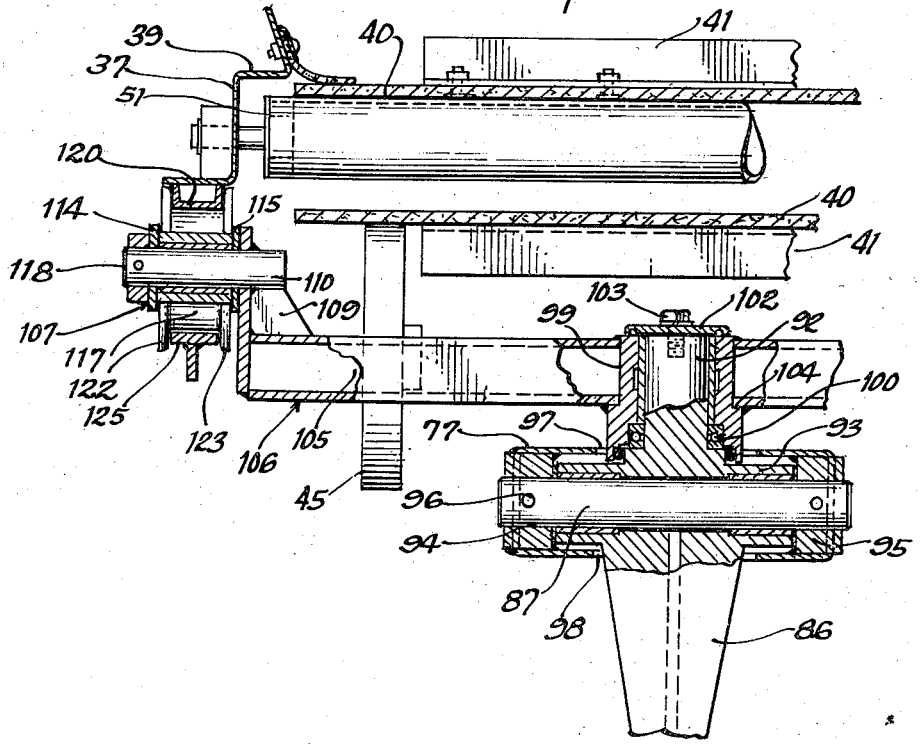

Fig. 5 is a top plane view of the supporting structure and the conveyor illustrated in Figs. 1 to 4 inclusive, and has the conveyor removed from the supporting structure to show details of the supporting and operating mechanism for the conveyor; and Fig. 6 is a fragmentary sectional end view, with parts broken away, of a portion of the structure depicted in Fig. 4, and drawn to a larger scale than Fig. 4, to illustrate features of the structure.

In the exemplary embodiment of my invention which is shown herein for illustrative purposes, a portable conveyor 10 is shown in an adaptation to use with a loading machine 12 which has thereon a sifting or screening mechanism 13, as shown in Figs. 1 and 2. In this adaptation the loading machine 12 is self motivated and is connected to the conveyor 10 through connected drawbars 11 and 14 on the conveyor and loading machine respectively, so that the conveyor is moved with the loading machine during use.

The illustrated loading machine has material gathering structure 15 at the front end thereof which gathers and feeds material from a surface, such as the ground, to an elevating conveyor 16 which comprises part of the loading machine. From the upper or discharge end of the elevating conveyor 16 on the loading machine, material is fed on to the upper end of the screening mechanism 13, which slopes rearwardly, and from whence a portion of the screened material is fed into a hopper 17 on the lower or material receiving end of the conveyor 10.

Referring now in greater detail to the structure of the conveyor which provides the subject matter of this invention, the portable conveyor 10, which is herein illustrated, has a supporting underframe 18 which, in the structure disclosed, and as shown in Fig. 5, includes longitudinally extending side beams 19 and 20 in acute angular relationship to one another and connected at their adjacent front ends by a suitable gusset plate structure 22. At their rear ends, the side plates 19 and 20 are separated, and their ends are secured together through cross beam 23. In the disclosed structure, gusset plates 24 and 25 are secured in the corners formed by the side beams 19 and 20 and the cross beam 23 to rigidify the structure. In their assembled relationship, the side beams 19 and 20 and the cross beam 23 together define the general shape of an isosceles triangle.

Wheels 26 and 27 support the rear end of the underframe and are mounted on axles 28 and 29 respectively which project from the underframe on opposite ends of the cross beam 23. Near the front end of the underframe, and although it is understood that other steerable front wheel supports might be used, the disclosed structure has a caster wheel 30 mounted for rotational movement relative to the underframe; the wheel being rotatably supporting between side arms of a yoke 32, which yoke is rotatable on a bearing contained in a housing 33. The connection of the yoke 32 to the underframe is made through a threaded shaft 34, which threaded shaft is manually rotatable by a handle 35 and is threaded into a cross member 36 secured to the side beams 19 and 20 adjacent the gusset plate structure 22. The rotation of the threaded shaft 34, and elevation of the caster wheel 30 relative to the underframe may be varied or may be raised to a position above ground level when the front end of the underframe is supported from a motivating vehicle, such as the loading machine shown in Figs. 1 and 2, through the draw-bars 11 and 14, as during movement from one position of use to another.

In the illustrated conveyor, a belt-type elevating conveyor structure 37 is utilized. This belt-type conveyor structure includes substantially parallel and longitudinally extending side frame members 38 and 39, between which an endless belt conveyor 40 which, in the present instance, has cleats 41 (Fig. 6) secured thereto, is supported by rollers 42 and 43 near the opposite ends of the conveyor structure. Between the ends of the conveyor structure, side rollers 44 and 45 are carried on shafts 46 journaled in supporting plates 47 which are secured to and extend downwardly from side frame members 38 and 29 to afford support along opposite sides of the return portion of the conveyor belt 40. Additional idler rollers such as 51 (shown in Fig. 6) are journaled between the side frame members 38 and 39 at spaced positions therealong for supporting the upper elevating portion of the conveyor belt. For strengthening and rigidifying the side frame members 38 and 39 between their ends, tensioned cables 48 and 49 have their mid-portions secured to the tops of side posts 50 and 52, which side posts are secured to and extend upwardly from the side frame members; the opposite ends of the tensioned cables 48 and 49 extending longitudinally of the conveyor and downwardly to anchors such as 53 and 54 near opposite ends of the bottoms of the side frame members.

At the upper end of the belt conveyor, a discharge chute 55 is secured to the side frame members 38 and 39. As depicted in Figs. 1, 2, 3 and 4, the chute 55 has a hopper portion 56 at the discharge end of the conveyor belt, into the hopper portion material is discharged from conveyor belt. Extending laterally and somewhat downwardly from the hopper portion 56 is a trough-type chute 57 for guiding the material to a suitable position, such as into a railway car or other vehicle.

For mounting the material receiving end of the conveyor structure 37 relative to the front end of the underframe 18, I have utilized a swivel connection 58 having a lower pivoted support structure 59 journaled for rotation relative to the underframe 18 in a cross beam 61 secured at opposite ends to the side beams 19 and 20. An upper bracket portion 60 of the swivel connection 58 is mounted on the pivoted support structure 59 for swinging movement by a cross pin 62; the upper end of the bracket portion 60 being secured to a cross member 63 which is also secured to the side frame members 38 and 39 of the conveyor structure. In the disclosed structure, the axis of rotation of the pivoted support structure 59 is substantially vertical with respect to the general plane of the underframe, so that it provides for horizontal swinging movement of the conveyor structure relative to the underframe. The axis of the cross pin 62, about which the upper bracket portion of the swivel connection is adapted to swing, is substantially horizontal to provide for vertical swinging movements of the conveyor structure, and, in this instance, this axis intersects the axis of the pivoted support structure. In order that the conveyor structure may be swung both laterally and vertically without interfering materially with the feeding of the material from a loading device into the hopper 17 on the conveyor structure, the axes of movements of the swivel connection 58 are located directly beneath the mid-portion of the top opening of the hopper.

To provide for the support of the discharge end of the conveyor structure and for effecting both lateral and vertical adjustments of the position of the conveyor structure, I have provided a movable supporting structure 64 which is mounted on a cross beam 65 secured to the longitudinally extending side beams 19 and 20 of the underframe at the mid-portion of the underframe and spaced from the swivel connection 58. As shown in Fig. 5, gusset plates 66 are desirably utilized in the corners at opposite ends of the cross beam 65 to rigidify the connection of the cross beam to the side beams 19 and 20 of the underframe.

Midway between the ends of the cross beam 65, a post 67, which comprises a part of the movable supporting structure 64, is journaled relative to the cross beam 65 for rotational movement about an axis which is parallel to the axis of rotational movement of the pivoted support structure 59 of the swivel connection 58. Secured to the lower portion of the post 67 and extending laterally therefrom is an arm 68 which, at the end remote from the post, is movably connected to a piston rod 69 of a hydraulic ram 70, which ram has a cylinder portion 72 movably anchored to the side beam 19 of the underframe by pin 73 at a position spaced from the axis of the post 67, so that extension and retraction of the ram effect rotational movements of the post within predetermined angularly separated positions.

Near the top of the post 67, a cross arm 74, comprising parallel and substantially coextensive side members 75 and 76 secured on opposite sides of the post, extends laterally to both sides of the post axis in the illustrated structure, and for reasons which will become quite obvious, the cross arm 74 is obliquely disposed with respect to the post axis, so that one end thereof is higher than the other end.

At the upper end of the cross arm 74, an arm 77 is mounted for vertical swinging movements relative to the cross arm by cross pin 78. At the lower end of the cross arm 74, a hydraulic ram 79 is movably secured thereto by a cross pin 80. This hydraulic ram has a piston rod 82 movably connected to a bracket 83 on the mid-portion of the arm 77 by pin 84, so that the cross arm 74, a portion of the arm 77 and the ram 79 form a triangle of variable shape with the arms 74 and 77 angularly movable with respect to one another and the ram 79 constituting an extensible side of the triangle. Thus, the arm 77 constitutes a vertically movable part of the movable supporting structure with the position thereof determined by the extension of the ram 79.

As a part of an auxiliary mechanism for maintaining parallel relationship of certain parts of the movable supporting structure and for keeping the axes of the connections thereof to the conveyor in parallel relationship to the axes of rotational movements of the post 67 and the pivoted support structure of the swivel connection 58, an arm 85 is secured to and extends downwardly from the upper end of the cross arm 74; the arm 85 being disposed between and secured to the side members 75 and 76 of the cross arm 74. A pivot arm 86 is movably connected by a cross pin 87 to the end of the arm 77 remote from the connection of the latter arm to the cross arm 74, so that the pivot arm 86 is adapted to swinging movement relative to the end of the arm 77 about an axis which is parallel to the axis of the swinging movements of the arm 77 relative to the upper end of the cross arm 74. For maintaining a desired parallel relationship of the axis of the pivot arm 86 to the axes of rotational movements of the post 67 and pivoted support structure 59 of the swivel connection 58 during the swinging movements of the arm 77 relative to the cross arm 74, a link 88 has its opposite ends connected to the lower ends of the pivot arm 86 and arm 85 respectively by cross pins 89 and 90. The spacing between the cross pins 89 and 90 is so related to the spacing between the cross pins 78 and 87 that the arm 85, pivot arm 86, arm 77 and link 88 constitute the sides of a parallelogram, in which the position of the arm 85 is in fixed parallel relationship to the axes of the post 69 and pivoted support structure 59, whereby the axis of the pivot arm 86 maintains parallel relationship to the arm 85 and post axis during and irrespective of the movements of the movable supporting structure.

As seen in Fig. 6, the pivot arm 86 has thereon an integral cylindrically formed top portion 92 which is coaxial with the arm, and also includes an integral cross bearing 93. Bosses 94 and 95 are secured in coaxial relationship within the upper end portion of the arm 77, as by welding, and carrying the cross pin 87, which cross pin is secured in place by a pin 96 extending through one of the bosses and the cross pin 87. The cross pin 87 is journaled in the cross bearing 93, so that the pivot arm 86 is free to swing relative to the axis of the cross pin 87 and relative to the arm 77. In the disclosed structure, the arm 77 is fabricated from sheet metal with a box-type section and has aligned cutaway portions 97 and 98 through which the pivot arm and the top portion thereof extend.

A bearing sleeve 99 is mounted for rotation relative to the cylindrical top portion 92 of the pivot arm 86 by a thrust bearing 11, and is secured in place by a disc-type cap 102 which overlaps the upper end of the bearing sleeve 99 and is secured to the end of the cylindrical top portion 92 by means, such as a cap screw 103 threaded into the end of the cylindrical portion. On its outer surface, the bearing sleeve 99 has a shoulder 104 and carries a cross arm 105 of a yoke 106 which rests against the shoulder 104 and is secured in place by welding. The cross arm 105 of the yoke 106 extends substantially equidistantly on opposite sides of the bearing sleeve 99, and has rocker arms 107 and 108 movably secured to its opposite ends, as shown in Figs. 3, 4 and 6.

For movably securing the rocker arms to the opposite ends of the cross arm 105, a bracket, such as 109, is secured to each end of the cross arm 105 and carries an outwardly projecting pin 110. Each pin extends through the mid-portion of the rocker arm which is carried thereby, and each rocker arm is movably held in place on the pin 110 by a keeper. Such mounting of the rocker arms allows them to rock relative to the aligned axes of the pins 110 at the opposite ends of the cross arm during vertical movements of the movable supporting structure 64 and the elevating conveyor structure 37. At their opposite ends, each of the rocker arms 107 and 108 if bifurcated and has spaced end portions, such as 114 and 115 (Fig. 6) which straddle rollers 116 and 117; the rollers each being supported by a cross shaft 118. Thus, the rollers 116 and 117 are aligned and are held in spaced relationship by the rocker arms.

At the mid-portion of the lower edge of each of the side frame members 38 and 39 of the conveyor structure 37, tracks 119 and 120 are secured to the side frame members and fit freely between side flanges 122 and 123 on the rollers. Also, guide rails 124 and 125 are secured to the side frame members 38 and 39 in spaced and substantially parallel relationship to the tracks 120 to ride between the roller flanges, thereby to guide the rollers and prevent them from becoming skewed or misaligned with respect to the tracks and side frame members as the conveyor structure is swung laterally. The tracks and guide rails are of sufficient length to provide for the full range of the desired elevational and lowering movements of the conveyor structure in use. It may be readily understood that relative longitudinal movement of the yoke 106 along the conveyor structure is required as the conveyor structure is moved vertically; the rollers moving outwardly along the conveyor structure as it is lowered and moving toward the material receiving end of the conveyor as it is raised.

Having reference to Figs. 4 and 5 of the drawings, the conveyor belt 40 is driven by a prime mover contained within a housing 126 mounted to one side and at the longitudinal mid-portions of the supporting underframe 18. The prime mover acts through a gear box 127 to drive a shaft 128, which shaft transmits driving force to a second gear box 129 mounted on the material receiving end of the conveyor, and through which the roller 43 is driven to effect movements of the conveyor belt. A control lever 130 is provided on the gear box 127 to effect starting and stopping of the conveyor operation while the prime mover is running. The shaft 128 has telescopically connected driving parts 132 and 133 with universal joints 134 and 135 near opposite ends of the telescopically connected parts, so that driving force is transmitted to the driving roller 43 irrespective of the adjusted position of the conveyor structure.

Through driving means such as a belt 136 (Fig. 5) the prime mover also operates a hydraulic pump mounted within a tank 137, which tank acts as a sump for hydraulic fluid supplied under pressure through the pump for the operation of the rams 70 and 79 which are utilized to effect both vertical and lateral swinging movements of the conveyor structure to adjusted positions. A valve 138 having control levers 139 and 140 is utilized to control the flow of pressure fluid to and from the hydraulic rams 70 and 79.

For adding stability to the disclosed conveyor in operation, when necessary, a box 142 is mounted at the rear end of the underframe structure 18 on the cross beam 23 for carrying ballast to provide weight at that position. In the disclosed structure, the box 142 has a cover 143.

From the foregoing description and reference to the accompanying drawings, it may be readily understood that I have provided a conveyor adapted to use as a portable unit when desired, and which is supported for both vertical and lateral swinging movements to various preselected positions, and which is stable and readily operable in any of such adjusted positions. When lowered to the position shown in Fig. 2, the conveyor has a clearance height within the limits of a loading machine with which it is adapted to use, when raised to a position such as that indicated in Fig. 1, the conveyor will discharge screened material at a height considerably above that of the highest part of the loading machine. A lowered position of the conveyor is depicted in dot and dash lines in Fig. 4 wherein parts corresponding to those bearing reference numerals 42, 55, 56 and 57 are indicated at their lowered position by reference numerals 42a, 55a, 56a and 57a respectively.

It is understood that the foregoing description is merely illustrative of a preferred embodiment of the invention and that the scope of the invention is not to be limited thereto but is to be determined by the appended claims.

I claim:

1. A portable conveyor comprising, in combination, a supporting frame structure with side members secured together at one end and connected by a cross member at the other end in the general form of an isosceles triangle, wheel and axle means at opposite ends of the cross member, steerable wheel means at said one end of the frame and supported for rotation relative thereto, a belt conveyor, means providing axes at one end of the supporting frame for mounting one end of the belt conveyor for lateral and vertical swinging movements relative to the supporting frame, and movable structure mounted between the ends of the supporting frame and having a movable connection to the conveyor for supporting the conveyor from the supporting frame at a position remote from said one end of the conveyor, said movable structure including hingedly connected arms and an extensible element connected to the arms at positions spaced from the hinge connection therebetween, one of said arms being rotatable relative to the supporting structure and the other being vertically swingable for determining the vertical and lateral positions of the other end of the conveyor relative to the supporting structure.

2. A portable conveyor as defined in claim 1, and wherein said movable connection of the movable structure to the conveyor comprises rails secured to and extending along opposite sides of the conveyor in parallel relationship to one another, means including a yoke extending across the conveyor and having a pair of flanged rollers in spaced relationship and engaged with the rails on each side of the conveyor, and means providing a rotational supporting connection at the mid-portion of said yoke.

3. A vertically and laterally adjustable elevating conveyor comprising, in combination, a supporting structure, a belt type conveyor structure, means providing transversely disposed axes at one end of the conveyor structure for mounting the conveyor structure on the supporting structure for swinging movements in transverse planes, and movable conveyor supporting means mounted on the supporting structure in spaced relationship to the first mentioned means and having a rotatable and linearly movable connection to the conveyor structure for supporting the other end of the conveyor structure relative to the supporting structure, said movable conveyor supporting means including parts hingedly connected together and further adjoined by an extensible element connected to the parts at positions spaced from the hinge connection therebetween, one of said parts being mounted for rotational movements relative to the supporting structure and the other of which is vertically swingable relative to said one of the parts for determining the vertical and lateral positions of said other end of the conveyor structure relative to the supporting structure.

4. A vertically and laterally adjustable elevating conveyor as defined in claim 3, and wherein the movable connection of the movable conveyor supporting means to the conveyor structure comprises rails secured to and extending along opposite sides of the conveyor structure in substantially parallel relationship to one another, a yoke extending across the conveyor structure and having roller means thereon movably engaging the rails, and means providing a rotational supporting connection between the yoke and said other of the parts at a position remote from the hinge connection between the parts.

5. A vertically and laterally adjustable elevating conveyor as defined in claim 3, and wherein said vertically movable part of the movable conveyor supporting means includes an element providing a rotational connection to the conveyor structure and having an axis substantially parallel to the axis of movement of the rotationally movable part, and parallelogram linkage means for maintaining the said parallel relationship of the said axes during movements of the vertically movable part.

6. In a vertically and laterally adjustable conveyor structure, an adjustable conveyor supporting structure comprising, in combination, a support member mounted for rotational movement about a fixed axis, a cross arm secured to the support member, a boom-type supporting arm having one end hingedly secured to one end of the cross arm for swinging movement relative thereto, an extensible member having one end hingedly connected to the other end of the cross arm and its other end hingedly connected to the mid-portion of the boom-type supporting arm so that said cross arm, said extensible member and a portion of said boom-type supporting arm form a triangle of variable shape, and said boom-type supporting arm comprising one element of a parallelogram linkage having another element of the linkage hingedly connected thereto which has an axis substantially parallel to said fixed axis.

7. In a vertically and laterally adjustable conveyor structure, an adjustable conveyor supporting structure as defined in claim 6, and wherein said cross arm is obliquely disposed with respect to the axis of movement of said support member.

8. In a vertically and laterally adjustable conveyor structure, an adjustable conveyor supporting structure as defined in claim 6, and further characterized by yoke means mounted on said other element of the linkage for rotational movement relative to the said axis thereof.

9. In a vertically and laterally adjustable conveyor structure, an adjustable conveyor supporting structure as defined in claim 8, and further characterized by pairs of rollers on opposite sides of the yoke means.

10. A vertically and laterally adjustable conveyor comprising, in combination, a belt-type conveyor structure, means providing transversely disposed axes at one end of the conveyor structure for mounting the conveyor structure for swinging movements in transverse planes, and movable conveyor supporting means spaced from the first mentioned means and including parts swingable in concentric relationship to an axis spaced from and parallel to one of the first mentioned axes and a part swingable about another axis parallel to said one of the first mentioned axes, and parallelogram linkage means for maintaining the parallel relationship of the said axes during swinging movements of the conveyor.

11. A portable conveyor comprising, in combination, a supporting frame structure with side members secured together at one end and connected by a cross member at the other end in the general form of an isosceles triangle, wheel and axle means at opposite ends of the cross member, steerable wheel means at said one end of the frame and supported for rotation relative thereto, a belt frame conveyor, means providing axes at one end of the supporting frame for mounting one end of the belt conveyor for lateral and vertical swinging movements relative to the supporting frame, and movable structure mounted at the mid-portion of the supporting frame and having a movable connection to the conveyor for supporting the conveyor from the supporting frame at a position remote from said one end of the conveyor, said movable structure having parts rotatable and vertically swingable relative to the supporting structure for determining the vertical and lateral positions of the other end of the conveyor relative to the supporting structure, said vertically swingable part of the movable structure including an element providing a rotational connection to the conveyor and having an axis substantially parallel to the axis about which said parts are rotatable relative to the supporting structure, and said element comprising a member of a parallelogram linkage for maintaining the parallel relationship of said axes during movements of the vertically swingable part.

12. A vertically and laterally adjustable elevating conveyor comprising, in combination, a supporting structure, a belt type conveyor structure, means providing transversely disposed axes at one end of the conveyor structure for mounting the conveyor structure on the supporting structure for swinging movements in transverse planes, and movable conveyor supporting means mounted on the supporting structure in spaced relationship to the first mentioned means and having a rotatable and linearly movable connection to the conveyor structure for supporting the other end of the conveyor structure relative to the supporting structure, said movable conveyor supporting means having parts mounted for rotational and vertical movements relative to the supporting structure for determining the vertical and lateral positions of said other end of the conveyor structure relative to the supporting structure, said vertically movable part of the movable conveyor supporting means including an element providing a rotational connection to the conveyor structure and having an axis substantially parallel to the axis of movement of the rotationally movable part, means for maintaining the said parallel relationship of said axes during movements of the vertically movable part, and said means for maintaining the parallel relationship of the axes comprising a parallelogram linkage in which an element which defines one side of the parallelogram linkage also serves to define one of the axes.

13. A vertically and laterally adjustable elevating conveyor comprising, in combination, a supporting structure, a belt type conveyor structure, means providing transversely disposed axes at one end of the conveyor structure for mounting the conveyor structure on the supporting structure for swinging movements in transverse planes, and movable conveyor supporting means mounted on the supporting structure in spaced relationship to the first mentioned means and having a rotatable and linearly movable connection to the conveyor structure for supporting the other end of the conveyor structure relative to the supporting structure, said movable supporting means having parts mounted for rotational and vertical movements relative to the supporting structure for determining the vertical and lateral positions of said other end of the conveyor structure relative to the supporting structure, said vertically movable part of the movable conveyor supporting means including an element providing a rotational connection to the conveyor structure and having an axial substantially parallel to the axis of movement of the rotationally movable part, and means for maintaining the said parallel relationship of said axes during movements of the vertically movable part, said means for maintaining the parallel relationship of the axes comprising a parallelogram linkage having side arms, and said vertically movable part including an extensible element hingedly connected to the mid-portion of one of the side arms of the parallelogram linkage.

14. A vertically and laterally adjustable conveyor comprising, in combination, a belt-type conveyor structure, means providing transversely disposed axes at one end of the conveyor structure for mounting the conveyor structure for swinging movements in transverse planes, and movable conveyor supporting means spaced from the first mentioned means and including parts swingable in concentric relationship to an axis spaced from and parallel to one of the first mentioned axes and a part swingable about another axis parallel to said one of the first mentioned axes, and means for maintaining the parallel relationship of the said axes during swinging movements of the conveyor, said means for maintaining the parallel relationship of the axes including elements of a parallelogram linkage having one member fixed in substantially parallel relationship to said one of the first mentioned axes.

References Cited in the file of this patent

UNITED STATES PATENTS

| | | |
|---|---|---|
| 314,860 | McCoffee | Mar. 31, 1885 |
| 431,724 | Nagle | July 8, 1890 |
| 1,259,176 | Volsky | Mar. 12, 1918 |
| 1,617,490 | Knox | Feb. 15, 1927 |